(12) United States Patent
Rojey et al.

(10) Patent No.: US 8,025,862 B2
(45) Date of Patent: *Sep. 27, 2011

(54) PROCESS FOR PRODUCING SYNTHESIS GAS BY STEAM REFORMING IN A REACTOR-EXCHANGER

(75) Inventors: Alexandre Rojey, Rueil Malmaison (FR); Stephane Bertholin, Villeurbannc (FR); Fabrice Giroudiere, Orlienas (FR); Eric Lenglet, Rueil Malmaison (FR)

(73) Assignee: IFP Energies Nouvelles, Rueil Malmaison Cedex (FR)

(*) Notice: Subject to any disclaimer, the term of this patent is extended or adjusted under 35 U.S.C. 154(b) by 640 days.

This patent is subject to a terminal disclaimer.

(21) Appl. No.: 11/523,805

(22) Filed: Sep. 20, 2006

(65) Prior Publication Data
US 2007/0092436 A1    Apr. 26, 2007

(30) Foreign Application Priority Data
Sep. 21, 2005    (FR) .................................... 05 09668

(51) Int. Cl.
*C01B 3/26* (2006.01)
(52) U.S. Cl. ...................... 423/652; 423/644; 423/648.1; 423/650; 423/651
(58) Field of Classification Search ................ 423/644, 423/648.1, 650, 651, 652
See application file for complete search history.

(56) References Cited

U.S. PATENT DOCUMENTS

| 3,839,194 | A  | * | 10/1974 | Sinfelt et al. ................... 208/139 |
| 4,337,170 | A  | * | 6/1982  | Fuderer .......................... 252/373 |
| 4,650,651 | A  | * | 3/1987  | Fuderer .......................... 422/191 |
| 4,714,593 | A  |   | 12/1987 | Natio |
| 5,229,102 | A  |   | 7/1993  | Minet |
| 5,938,800 | A  | * | 8/1999  | Verrill et al. .................. 48/127.9 |
| 6,231,831 | B1 | * | 5/2001  | Autenrieth et al. ........ 423/648.1 |
| 6,497,856 | B1 | * | 12/2002 | Lomax et al. ................. 423/651 |
| 7,687,050 | B2 | * | 3/2010  | Rojey et al. ................... 423/650 |
| 2002/0073938 | A1 |  | 6/2002 | Bool |
| 2003/0066240 | A1 | * | 4/2003 | Keller ......................... 48/197 R |

FOREIGN PATENT DOCUMENTS

WO    WO 0202220 A1    1/2002

* cited by examiner

*Primary Examiner* — Jessica L Ward
*Assistant Examiner* — Paul Wartalowicz
(74) *Attorney, Agent, or Firm* — Millen, White, Zelano & Branigan, P.C.

(57) ABSTRACT

The invention concerns a process for producing synthesis gas, SG, from hydrocarbons and/or recycled compounds. In the process: a stream comprising a first feed F1 supplemented with steam undergoes steam reforming in a multi-tube reactor-exchanger R having a shell and reaction tubes containing a steam reforming catalyst within the shell; the reaction tubes are heated by convection by circulating in the shell, in overall counter-current mode, a heating fluid HF external to the tubes, which fluid comprises a first combustion gas stream of a second feed F2, then fluid HF is mixed, in 1 to 4 complementary combustion zones internal to the shell, with a third feed F3 and a gas comprising oxygen, to increase the temperature of the HF, and then the mixture obtained circulates in R to heat the reaction tubes in a complementary manner; and SG is produced from the steam reforming effluent from F1 and optionally part or all of the HF.

22 Claims, 5 Drawing Sheets

PROCESS FOR PRODUCING SYNTHESIS GAS BY STEAM REFORMING IN A REACTOR-EXCHANGER

This application corresponds to a concurrently filed U.S. patent application for "PROCESS FOR PRODUCING SYNTHESIS GAS BY STEAM REFORMING AND PARTIAL OXIDATION", invented by Alexandre Rojey, Stephane Bertholin, Fabrice Giroudiere and Eric Lenglet, and was filed as French Application No. 05/09.670 on Sep. 21, 2005 U.S. Ser. No. 11/523,741.

FIELD OF THE INVENTION

The invention relates to the production of synthesis gas from natural gas or light hydrocarbons: methane, ethane, propane, butane, or hydrocarbons containing less than 10 carbon atoms, and mixtures thereof.

Synthesis gas is a mixture principally composed (after eliminating water) of hydrogen, carbon monoxide and carbon dioxide. It often contains small quantities of residual hydrocarbons, typically methane.

Synthesis gas may be used to produce hydrogen. It may also be used to produce liquid compounds by chemical conversion, for example of oxygen-containing compounds (methanol, dimethyl ether, etc) or hydrocarbons, in particular olefins or paraffins.

PRIOR ART

Several methods for producing synthesis gas are already known, in particular steam reforming (the most widely used process), partial oxidation and the autothermal process.

Steam reforming (known also as SMR, steam methane reforming) consists of reacting the feed over a catalyst in the presence of steam to obtain a synthesis gas which (apart from steam) principally contains a mixture of oxides of carbon and hydrogen. That operation is endothermic. It is typically carried out by circulating the feed, in the presence of steam, in tubes filled with catalyst (generally a nickel catalyst, for example comprising 6% to 25% by weight of nickel deposited on a support principally comprising alumina, or a mixture of alumina and one or more refractory compounds). The tubes are typically heated by radiation in tube furnaces. The hottest points of the flame must be kept sufficiently distant from the tubes so that they do not excessively overheat and for this reason, the furnaces used are bulky and expensive.

Steam reforming in a reactor-exchanger (meaning that the heat is mainly transmitted by convection and not mainly by radiation as in a furnace) has already been proposed; the reaction medium is heated indirectly by high temperature fumes.

Using very high temperature fumes in an exchanger turns out, however, to be difficult.

Partial oxidation (known as POX) consists of forming, by combustion under sub-stoichiometric conditions, a high temperature mixture—generally between 1000° C. and 1600° C.—of hydrocarbons and air or oxygen, to oxidize the hydrocarbons and obtain a synthesis gas. That process uses large quantities of oxygen when air cannot be used (when a nitrogen-free synthesis gas is required).

The autothermal process carries out partial oxidation immediately followed by catalytic steam reforming in adiabatic mode at high temperature, for example in the 900° C.-1000° C. range for the outlet temperature. That process combines the two preceding reaction modes in series. It consumes less oxygen than the POX process, but requires a catalytic bed.

One aim of the process of the invention is to produce synthesis gas from light hydrocarbons in a facility which is much more compact than a conventional steam reforming facility (with a furnace), typically necessitating less oxygen than POX and autothermal processes, or even no oxygen at all, and limiting the combustion means employed. The process of the invention is thus a high performance process from the energetic viewpoint, with a reduced bulk and limited investment costs.

The invention can also reduce the highest temperatures used while keeping the energy efficiency high. This increases reliability and service life in the facility.

BRIEF DEFINITION OF THE INVENTION

To achieve the aims mentioned above, the process of the invention uses a heating fluid HF to carry out the heat transfers necessary for the endothermic steam reforming reactions.

One of the major aspects of the process is the use, in a reactor-exchanger R carrying out steam reforming, of a heating fluid HF obtained using a staged combustion, to transfer heat several times to the steam reforming reaction medium, with one or more intermediate combustion step(s) to raise the temperature of said heating fluid HF. Multiple reheating steps use a smaller volume of gas to transfer a given quantity of heat. This saves energy. Further, the compact nature of the facility is much larger than that of a conventional steam reforming facility using a furnace. Multiple reheating (combustion) of HF may also limit the maximum temperatures employed, and thus increase the service life of the facility.

In a variation of the process of the present invention, it has also been discovered that it is possible to carry out staged combustion in a more compact and cheaper facility by carrying it out in a compact reactor-exchanger as long as the presence of a flame at the steam reforming tubes is avoided, eliminating hot spots as they may result in deterioration or destruction of the tubes.

Thus, the invention allows the steam reforming operation to be carried out in a reactor-exchanger R by developing, at the heating fluid HF, a flameless combustion reaction inside the shell of the reactor-exchanger R, more or less at the level of the steam reforming tubes.

DETAILED DESCRIPTION OF THE INVENTION

The references indicated above correspond to those used below in the description of the accompanying Figures. In the following, the expressions "partial combustion" and "partial oxidation", or "POX", are used interchangeably. The term "combustion" may designate partial or complete combustion.

The invention provides a process for producing a synthesis gas SG from a general feed F constituted by hydrocarbons and optionally recycled compounds, F comprising a first feed F1, a second feed F2 and a third feed F3, in which:

a stream comprising the first feed F1 supplemented with steam undergoes steam reforming to produce at least one fraction of synthesis gas SG in at least one multi-tube reactor-exchanger R comprising a plurality of reaction tubes (38) containing a steam reforming catalyst and a shell containing said tubes;

said reaction tubes (38) are-heated principally by convection by circulating a heating fluid HF external to said tubes in said shell, in which HF comprises at least a first stream of gas from partial or total combustion of the second feed F2, which is caused to circulate in the reactor-exchanger R to heat the reaction tubes, then said fluid HF is mixed in a complementary combustion zone (32, 34, 42, 44) with at least a portion of the third feed F3 and a gas comprising oxygen to increase the temperature of said first stream, then the stream of the mixture obtained circulates in the reactor-exchanger R to provide complementary heat to the reaction tubes (38) before leaving the reactor-exchanger;

synthesis gas SG is produced from the steam reforming effluent F1 and optionally from part or all of the HF.

Feeds F1, F2 and F3 may be diverse, gaseous and/or liquid. They may have the same or different compositions. Usually, however, feeds F1, F2 and F3 are essentially gaseous hydrocarbons at a pressure of 2 MPa and a temperature of 20° C. Typically, F1, F2 and F3 have identical compositions and derive from a natural or purified gas or from a gas mixture with a composition, as a molar %, principally of hydrocarbons containing less than 5 carbon atoms.

According to the invention, the term "feed" denotes both a hydrocarbon feed and a recycling stream derived from the hydrocarbon feed. F2 and/or F3 may also comprise or be constituted by a recycle stream, in particular a stream comprising a fraction separated downstream such as a SG fraction separated by adsorption and desorption with pressure balance for the production of hydrogen (typically a gas purge, of an adsorption termed PSA). It is thus possible to use a purge gas containing CO and residual methane and often $CO_2$ as F2 and/or F3. Alternatively, it is possible to use substantially pure hydrogen for F2 and/or F3, in particular a fraction of the hydrogen produced when SG is used to produce hydrogen.

One or two or three or even between 4 and 8 complementary combustion zones may in general be used. Preferably, between 1 and 4 complementary combustion zones may be used, highly preferably 2 to 3 complementary combustion zones. This staged combustion allows a large amount of heat to be transferred, supplied in temperature increments, with intermediate chilling (transfer of heat for steam reforming) without reaching the particularly high temperatures which would be obtained if all of the combustion were to be carried out in a single step. In contrast, if the maximum temperature of the combustion gas is limited, a staged combustion with intermediate heat transfer could transfer a substantially larger quantity of heat for a given volume of combustion gas or an identical quantity of heat for a lower volume of combustion gas.

These combustion zones (initial and/or complementary) may be internal and/or external to the shell of the reactor-exchanger R. Combustion may be partial or total, and use oxygen or air, or air enriched with oxygen as oxygen containing gas.

In particular, it is possible to use as the heating fluid, HF, a stream from the partial oxidation of hydrocarbons with oxygen, typically at a pressure in the range 0.5 to 12 MPa, substantially free of nitrogen and preferably comprising steam. Such a fluid HF at high pressure and comprising hydrogen has very good thermal fluid properties (high heat exchange coefficient).

The heating fluid HF may also frequently be a gas from the complete combustion of hydrocarbons in air, typically at a pressure in the range 0.4 to 4 MPa.

In a first variation, the complementary combustion zone(s) is(are) disposed inside the shell of the reactor-exchanger R. The initial combustion zone may also be an internal zone of the reactor-exchanger.

Typically, the complementary combustion zone is a zone which is free of reaction tubes and substantially contiguous with the internal wall of the shell of the reactor-exchanger R.

Highly preferably, in this first variation of the invention, the production of flames in contact with the reaction tubes is avoided.

In a first combustion mode variation, this may be achieved by limiting the presence of flames to one or more combustion zones which is(are) free of reaction tubes, in particular contiguous with the internal wall of the shell of the reactor-exchanger R. In particular, one or more flat or short flame burners may be used in known manner, and/or multiple small burners which produce smaller flames as a result.

In a further combustion mode implementation, at least part of F3 and a gas containing oxygen (for example air or $O_2$) are injected at one point inside the shell of the reactor-exchanger under turbulent conditions and/or with sufficient recirculation to obtain a homogeneous combustion zone in the reactor-exchanger R.

To produce combustion conditions which are as homogeneous as possible, relatively moderate temperatures may be used (for example with a final temperature of less than 1200° C., or less than 1150° C., for example in the range 1000° C. to 1180° C.) to more readily carry out homogeneous combustion (flameless). The range of suitable conditions (concentrations and temperatures) for such a homogeneous combustion regime may be precisely determined by modeling the combustion and/or by tests by causing the gas recirculation and turbulence to be varied). Homogeneous combustion is favoured by a highly turbulent mixture of reagents and by recirculating them. Preferably, homogeneous combustion is carried out in the immediately proximity to the steam reforming tubes and the heat of combustion is immediately transferred to the tubes. Homogeneous combustion may then be continued at the steam reforming tubes as it does not generate hot spots which might deteriorate them. It then becomes possible to render the temperatures in the reactor-exchanger more homogeneous, which can optimize heat transfer, reduce the number of complementary combustion zones and/or limit the local maximum effective temperature of the fluid HF, which is favourable from the point of view of the service life of the equipment.

In a third implementation of combustion, at least a portion of F3 and a gas containing oxygen are injected to one point inside the shell of the reactor-exchanger upstream of a catalytic combustion zone under conditions in which the temperature of the mixture obtained is lower than the temperature at which combustion occurs with a flame.

Catalytic combustion is a technique which is well known in the combustion field, and may use various catalysts. Reference may, for example, be made to the following patent applications or patents: US20050081443; U.S. Pat. Nos. 5,980,843; 5,405,260; EP-B1-0 689 870; EP-B1-0 712 661.

The initial and final temperature zones allowing catalytic combustion to be carried out Under the best conditions may be determined by tests for a given catalyst. The preferred initial temperatures of the mixture (before combustion) are below 900° C., and usually in the range 800° C. to 880° C. The preferred final temperatures (after combustion) are below 1000° C., and usually in the range 800° C. to 980° C. Further, catalytic combustion may advantageously be limited to the coldest part of the reactor-exchanger R. Thus, if the stream comprising the first feed F1 supplemented with steam enters at one end of the reactor-exchanger, the catalytic combustion zone is typically located in the first half of the reactor-exchanger relative to that end.

In a second variation of the process of the invention, the complementary combustion zone(s) (42, 44) and/or the initial combustion zone may be disposed outside the shell (37) of the reactor-exchanger R. This option results in a less compact embodiment, but allows standard dimensions for burners and combustion zones to be utilized. It is also possible to combine one or two external combustion zones (for example the initial zone) and one or two or more internal combustion zones.

The heating fluid HF may be circulated in different ways.

Usually, the stream comprising the first feed F1 supplemented with steam circulates in the reactor-exchanger essentially in one direction, and the heating fluid HF circulates at least generally as a counter current with respect to F1 (i.e. either as a pure counter current, HF circulating parallel to the tubes, or locally as a cross-current, but overall as a counter current).

Co-current circulation is possible, however. In this case, if the stream comprising the first feed F1 supplemented with steam circulates in the reactor-exchanger essentially in one direction, the heating fluid HF circulates at least overall as a co-current with respect to F1 (pure or overall co-current).

The respective pressures P1 and P2 of the steam reforming effluent, denoted SG1, and of HF at the outlet from the reactor-exchanger typically satisfy the following conditions:

0.8 MPa<P1<12 MPa; preferably, 1.5 MPa<P1<5 MPa; and highly preferably, 1.8 MPa<P1<4.5 MPa;

0.4 MPa<P2<12 MPa; preferably, 0.4 MPa<P2<5 MPa; and highly preferably, 0.8 MPa<P2<4.5 MPa.

The relatively high pressure of HF allows high heat transfer properties to be achieved.

In general, at the outlet from the reactor-exchanger R, the heating fluid HF, typically at a relatively high temperature, for example of the order of 1000° C., exchanges heat with the stream comprising the first feed F1 supplemented with steam, for partial preliminary steam reforming of F1 in another principal reactor-heat-exchanger R. This pre-steam-reforming is typically carried out in a manner similar to that of the principal steam reforming, in a reactor-exchanger (2b) with reaction tubes containing a steam reforming catalyst, and is typically carried out at temperatures which are 100° C. to 200° C. lower than those of the principal steam reforming in the reactor-exchanger R.

At the outlet from the reactor heat exchanger (2b), the heating fluid HF typically transfers its residual heat to the stream comprising the first feed F1 supplemented with steam, in a heat exchanger (2a) disposed just upstream of (2b) with respect to F1. Thus, the thermal potential of the HF is used efficiently: on leaving R, the HF produces a relatively high temperature necessary for partial preliminary steam reforming in (2b), then produces a relatively lower temperature required to pre-heat the stream comprising the first feed F1 supplemented with steam.

The stream comprising the first feed F1 supplemented with steam is typically pre-heated to between 500° C. and 740° C. (and preferably to between 580° C. and 700° C.) before it enters the reactor-exchanger R. The temperature of the steam reforming effluent SG1 at the outlet from the reactor-exchanger R is typically in the range 800° C. to 950° C. (preferably in the range 820° C. to 900° C.) and the temperature of HF at the outlet from the reactor-exchanger R is typically in the range 850° C. to 1150° C., more preferably in the range 900° C. to 1050° C.

The invention also concerns a process for producing hydrogen from a synthesis gas comprising the synthesis gas SG from the process described above, in any one of its variations.

The combustible portion of the heating fluid HF (or F2 and/or F3) may essentially be constituted by a fraction of the substantially pure hydrogen produced from SG.

F2 and/or F3 may also comprise a purge gas derived from a PSA (pressure swing adsorption) adsorption purification step carried out on a stream derived from SG. This allows said purge gas to be utilized advantageously.

The invention will be better understood from the following description of the accompanying Figures which describe the invention in the case in which the heating fluid HF is a stream from the partial oxidation of gaseous hydrocarbons with oxygen.

DESCRIPTION OF THE FIGURES

Figure 1:
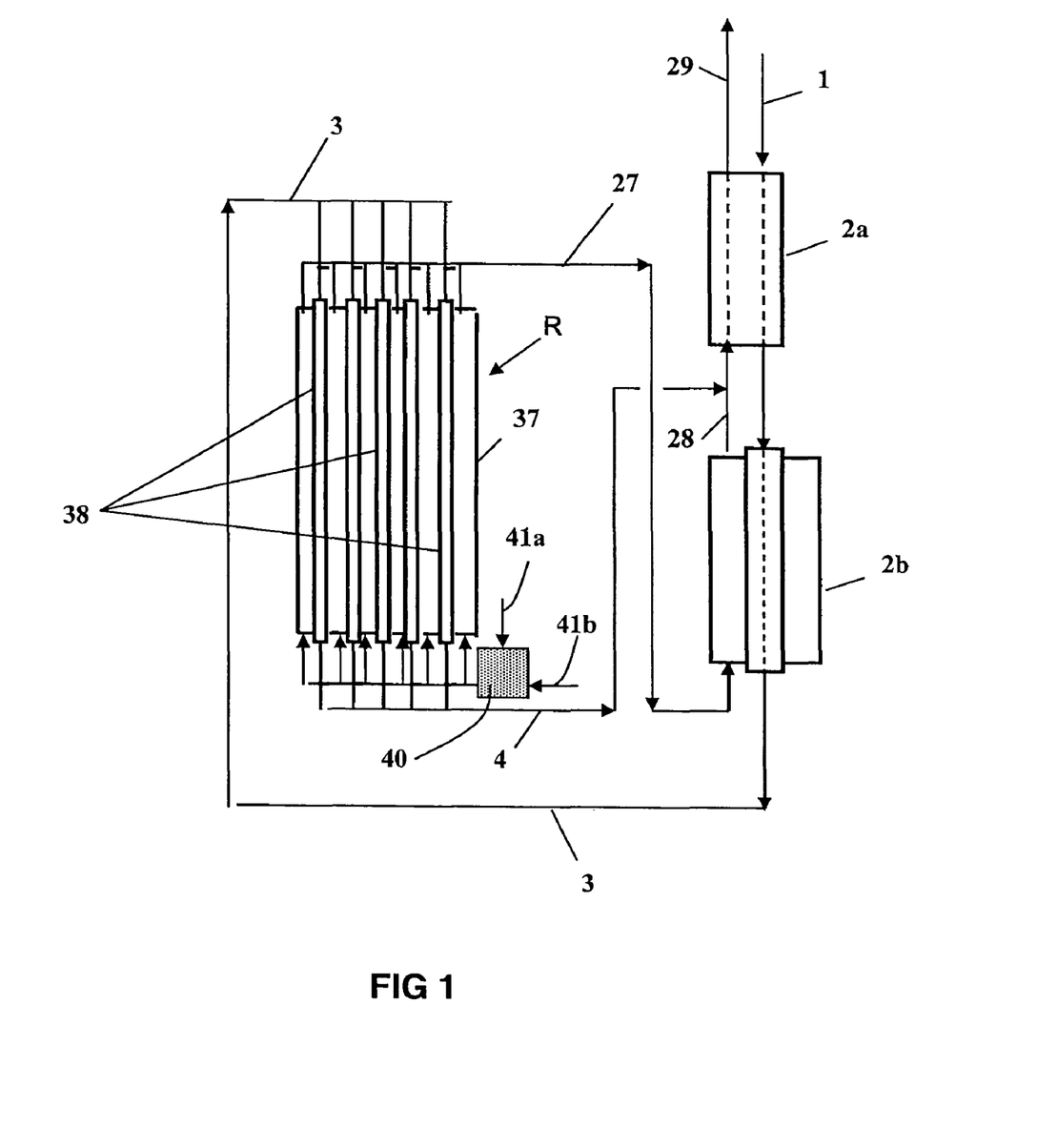
FIG. 1 shows a simplified flowchart for the process of the invention.

Reference will initially be made to FIG. 1.

Feeds F1, F2 and F3 are of identical composition, and constituted by a mixture of a generally purified gas typically comprising more than 80 molar % of methane and 2% to 15% of ethane. The stream comprising the first feed F1 supplemented with steam has a $H_2O$/F1 molar ratio which is typically in the range 1.8 to 3.5. This stream enters via a line 1 into the preheating exchanger 2a then traverses the reactor-exchanger 2b in which pre-steam-reforming is carried out with a relatively moderate outlet temperature, typically in the range 650° C. to 770° C., preferably in the range 670° C. to 740° C. The reactor-exchanger 2b is a multi-tube reactor with tubes containing a steam reforming catalyst, for example one of the catalysts described in the examples in U.S. Pat. No. 4,906,603. At the outlet from the reactor-exchanger 2b, the stream comprising the first feed F1 supplemented with steam, partially converted into synthesis gas, supplies the principal reactor-exchanger R via a line 3, which reactor-exchanger is also multi-tubular with tubes containing a steam reforming catalyst, typically of the same type as that of the reactor-exchanger 2b. This stream is then distributed into a plurality of reaction tubes 38 disposed inside the shell 37 of the reactor-exchanger then, after steam reforming, leaves the reactor-exchanger R via a line 4, forming a first synthesis gas SG1, and is cooled in the exchanger 2a, mixed with the second synthesis gas SG2.

The feed F2 supplies a partial oxidation chamber 40 via a hydrocarbon inlet 41a; the chamber is also supplied with oxygen via a line 41b. The feed F2 and/or oxygen supply may typically be supplemented with steam (for example 20% to 50% molar of steam) to limit the risk of carbon formation (soot). The outlet temperatures from the partial oxidation chamber 40 are typically in the range 1100° C. to 1250° C., preferably in the range 1140° C. to 1200° C. This temperature may be controlled by modulating the $O_2$/(F2 hydrocarbons) molar ratio, which is usually in the range 0.48 to 0.85.

The heating fluid HF which is thus formed enters the reactor-exchanger R in which flameless combustion may occur, and transfers a substantial portion of the heat of partial oxidation to the reaction tubes 38, thus allowing steam reforming of F1. Inside the reactor-exchanger R, a fraction F3 of the feed is added along with oxygen for example, turning to FIG. 2, to carry out staged combustion in the reactor-exchanger R and transfer more heat to the steam reforming tubes. Turning back to FIG. 1, stream HF leaves the reactor-exchanger R via the line 27 to form a second synthesis gas SG2. Said synthesis gas SG2, the temperature of which at the reactor-exchanger R outlet is still high, for example of the order of 1000° C., supplies the reactor-exchanger 2b for pre-steam-reforming of the feed F1, where it is used as a heating fluid, then leaves 2b via line 28, and is mixed with the synthesis gas SG1 circulating in line 4, then the mixture SG which is formed is cooled in the exchanger 2a from which it leaves via a line 29. The synthesis gas SG can thus undergo supplemental treatments such as more severe cooling, steam conversion of CO, chemical conversion, etc. By means of 2a and 2b, the facility of FIG. 1 has good thermal recovery, in particular for the hottest effluent from the reactor-exchanger R, i.e. SG2.

Figure 2:
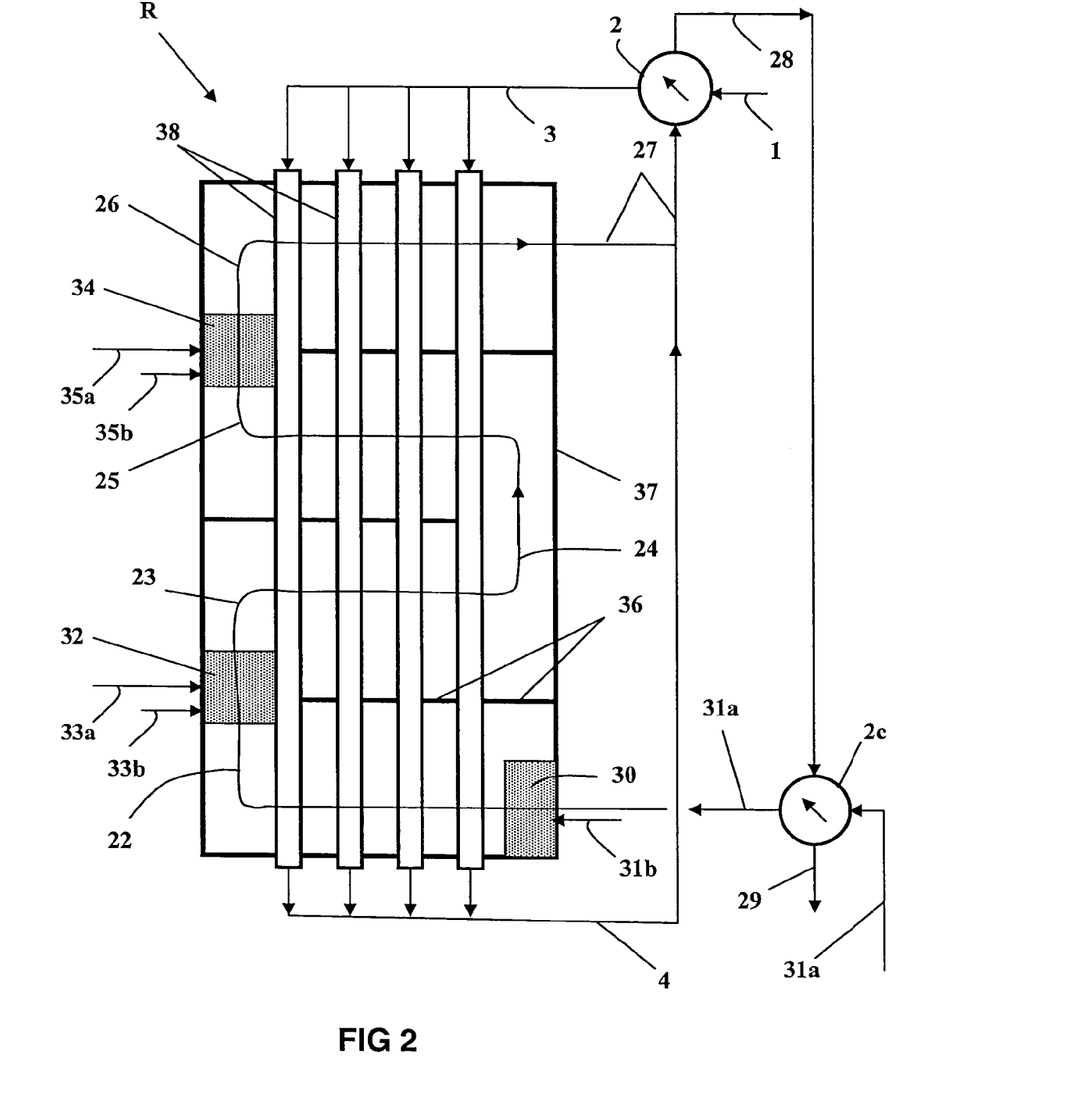
FIG. 2 shows another simplified flowchart for the process of the invention, showing a reactor-exchanger comprising internal partial oxidation zones in more detail.

Referring now to FIG. 2, the reactor-exchanger R of FIG. 2 comprises 3 chambers, or partial oxidation zones in series, so that said staged partial oxidation can transmit more heat to the steam reforming tubes 38 and/or employ lower maximum temperatures for HF. Said 3 zones: 30 (initial zone), 32 and 34 (complementary zones) are inside the shell 37 of R. Said zones 30, 32 and 34 are supplied with hydrocarbons from the feed F2 (typically supplemented with steam) respectively via lines 31a, 33a and 35a. They are also supplied with oxygen respectively via lines 31b, 33b and 35b. Steam may also be present under the conditions described for the facility of FIG. 1.

The heating fluid circulates inside R as a cross-current and an overall counter current following the circulation line shown in FIG. 2 as indicated by reference numerals 22, 23, 24, 25 and 26. Said circulation is imposed by the presence of crossbars or baffles 36 in the reactor-exchanger R, in a manner analogous to the crossbars or baffles of the shell of a conventional shell and tube heat exchanger.

Recovery of heat from the effluents from the reactor-exchanger R of the device of FIG. 2 is also highly effective, but differs from that of FIG. 1: again, two exchangers are used, which have reference numerals 2 and 2c, but only exchanger 2 transmits heat to the steam reforming feed F1, while exchanger 2c transmits heat to the partial oxidation feed F2, supplemented with steam. Thus, the several streams feeding R are pre-heated, in particular the steam reforming feed and the partial oxidation feed F2. It is also possible to pre-heat the fluids added to HF during the staged partial oxidation, in particular the hydrocarbons and/or steam, and/or to pre-heat the oxygen.

Figure 3:
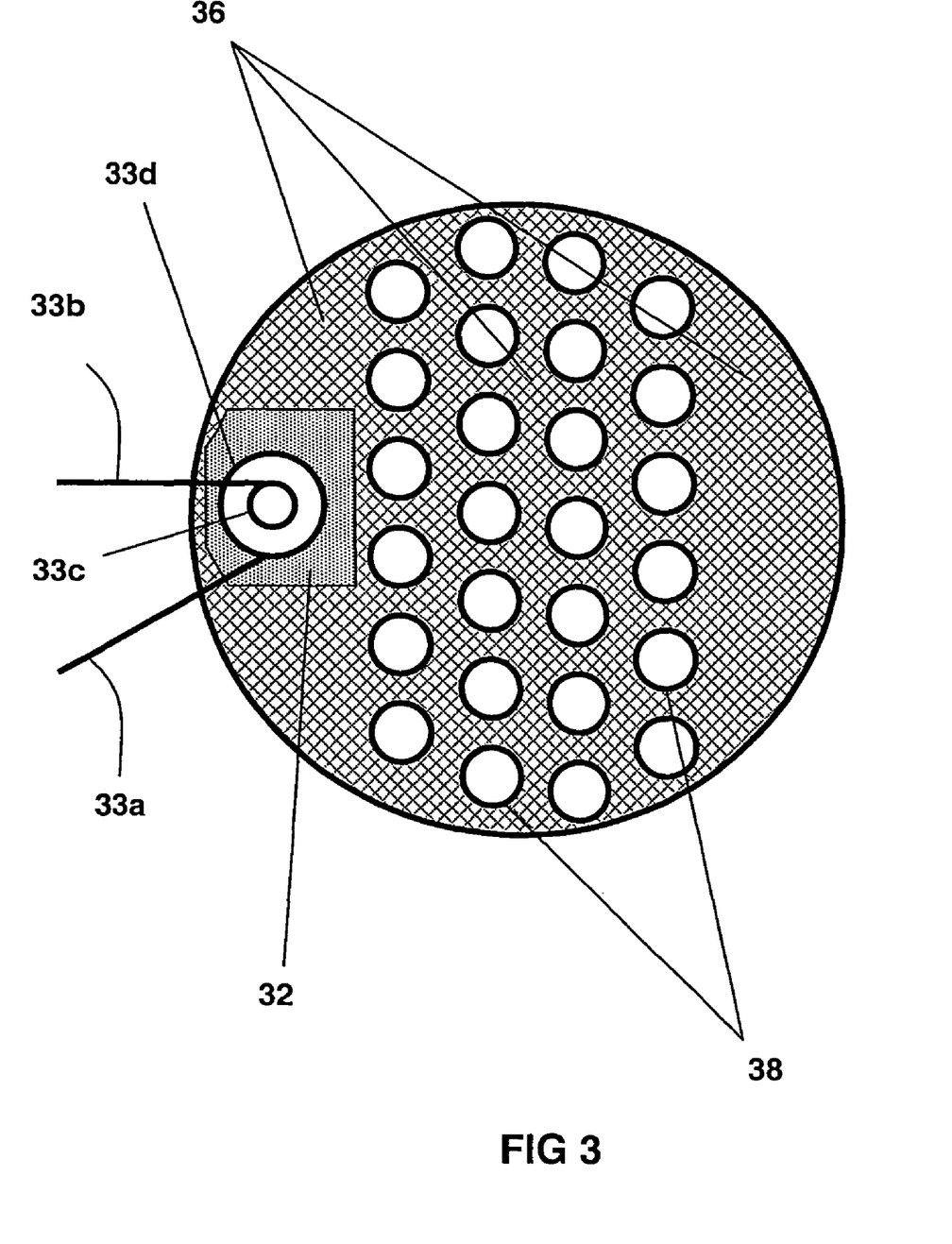
FIG. 3 shows a section through the reactor-exchanger of FIG. 2.

FIG. 3, which shows a top view of a section of the reactor-exchanger R of FIG. 2 above zone 32 shows a top view of said baffles stays 36. The partial oxidation zone 32 has a burner, hydrocarbons and oxygen being introduced via lines 33a and 33b which tangentially supply two concentric tubes 33d and 33c to create rapid mixing by contra-rotating vortices.

The ends of the reactor-exchanger R of FIG. 2 are typically domed (not shown for clarity reasons in the Figure) and R encompasses all of the reaction tubes 38.

The facility of FIG. 2 shows only one heat exchanger 2, but could also comprise reactor-exchangers and/or heat exchangers such as 2a and 2b of the facility in FIG. 1.

The reactor-exchanger R of FIGS. 2 and 3 shows only one type of reactor-exchanger which can be used to carry out the process of the invention; other types of reactor-exchanger R may be used without departing from the scope of the invention, including reactor-exchangers having bayonet tubes. In that type of reactor-exchanger, each of the reaction tubes 38 comprises two concentric tubes and the steam reforming feed circulates in succession in the annular space then in the inner central tube or in the reverse direction, the inlet streams F1 and the stream SG1 respectively entering and leaving at the same end of R.

Figure 4:
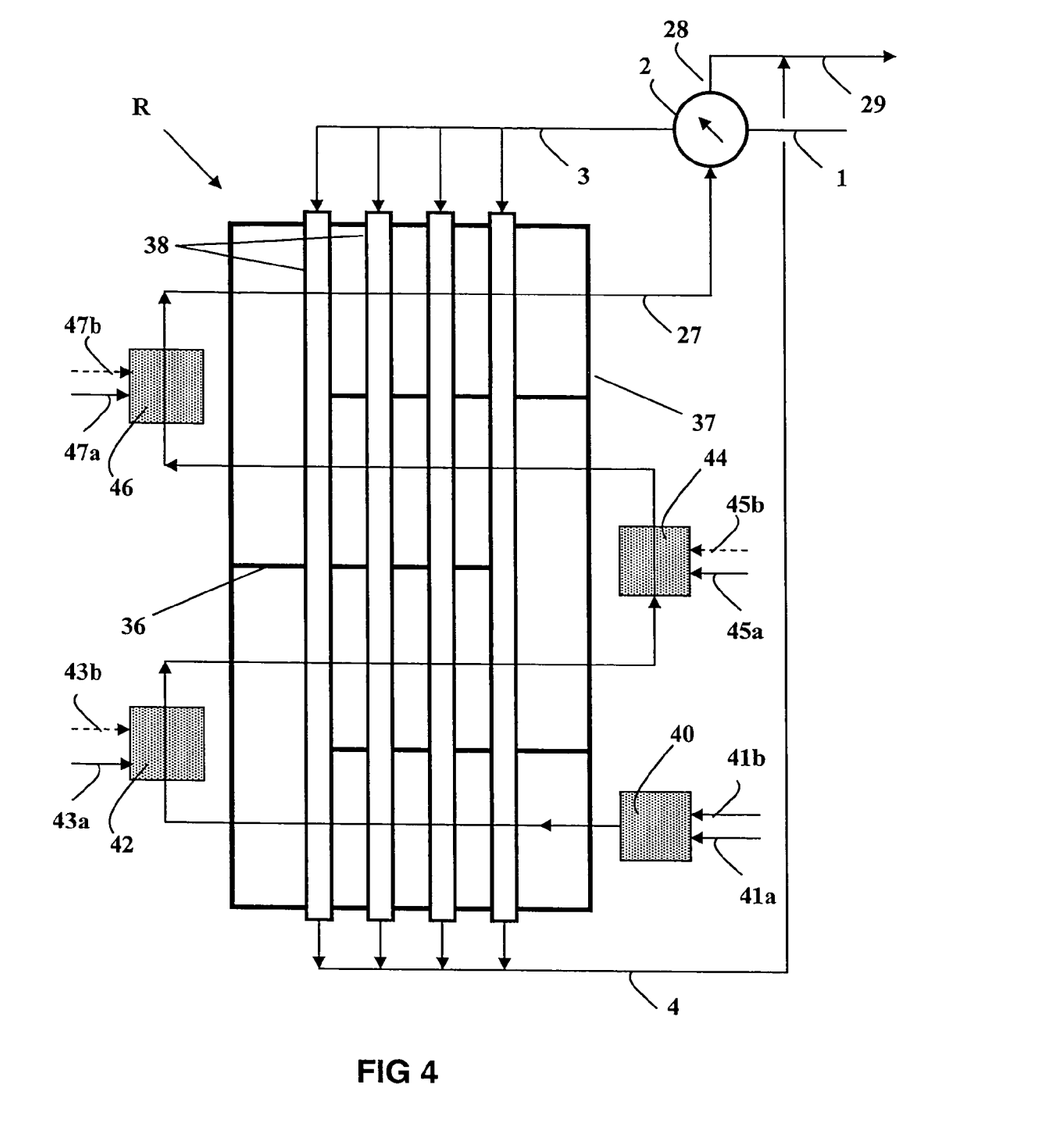
FIG. 4 shows another simplified flowchart for the process of the invention, showing a reactor-exchanger comprising external partial oxidation zones in more detail.

The facility of FIG. 4 is close to that of FIG. 2, but uses external partial oxidation zones which are not inside R, allowing the use of standard burners and/or oxidation zones without problems with bulk at the price of a less compact implementation. Said zones 40, 42 and 44 are supplied with hydrocarbons F2 and F3 via lines 41a, 43a and 45a respectively. They are also supplied with oxygen via lines 41b, 43b and 45b respectively. Steam may also be present under the same conditions as for the facility of FIG. 1.

Figure 5A:
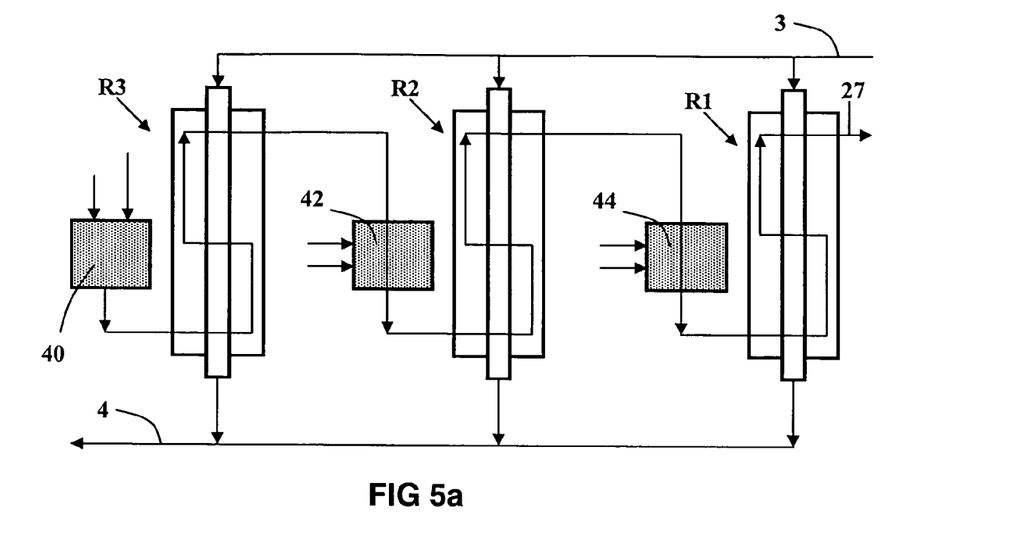
FIGS. 5a and 5b show simplified flowcharts for the process of the invention in facilities comprising several reactor-exchangers.

FIG. 5a shows a facility comprising three reactor-exchangers R1, R2 and R3, traversed in parallel by stream branches comprising the first feed F1 supplemented with steam, and traversed in series by a staged partial oxidation stream HF, with intermediate re-heating of HF between two successive reactor-exchangers. Such a facility could comprise not three but two, four or, in general, a plurality of reactor-exchangers R1.

Figure 5B:
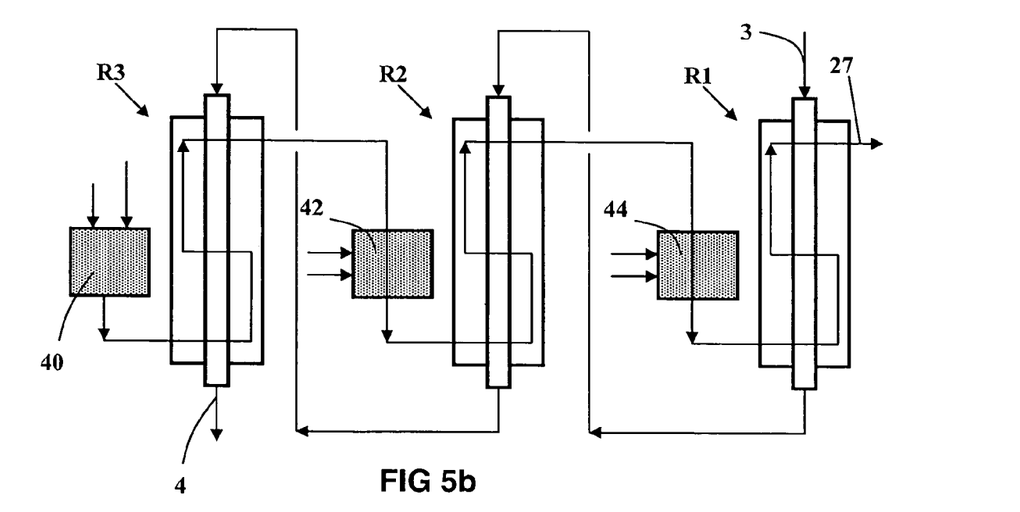

The facility of FIG. 5b is close to that of FIG. 5a but uses, for the stream comprising the first feed F1 supplemented with steam, circulation in series (staged steam reforming) in exchangers R1, R2, R3, as a counter current together with the partial oxidation stream HF, which is also staged. This configuration can result in very high thermal recovery and energy efficiency as reactor-exchanger R1 can carry out pre-steam reforming which may be operated at a relatively low temperature. Similarly, the facility of FIG. 5b could comprise not three but two, four or in general a plurality of reactor-exchangers R1.

Without further elaboration, it is believed that one skilled in the art can, using the preceding description, utilize the present invention to its fullest extent. The following preferred specific embodiments are, therefore, to be construed as merely illustrative, and not limitative of the remainder of the disclosure in any way whatsoever.

In the foregoing and in the following examples, all temperatures are set forth uncorrected in degrees Celsius and, all parts and percentages are by weight, unless otherwise indicated.

EXAMPLE

Production of a synthesis gas SG at a pressure of 2.5 MPa from a natural gas was simulated in a facility of the type shown in FIG. 2. Feeds F1 and F2 had identical compositions (natural gas supplemented with methane).

The inlet conditions (line 1) were as follows: F1=natural gas, with a flow (of methane) of 50000 $NM^3/h$; F1 was supplemented with $H_2O$ (steam) with a $H_2O/F1$ molar ratio of 3 ($H_2O$ and F1, in % molar). The F1+$H_2O$ stream was pre-heated to 600° C. in exchanger 2, then supplied the reactor-exchanger R at a pressure of 2.5 MPa which was the pressure of the facility (for simulation, the pressure drops were not taken into account). After catalytic steam reforming with an outlet temperature of 850° C. (in line 4), the first synthesis gas SG1 obtained was mixed with the second synthesis gas SG2 circulating in line 27, the mixture SG1+SG2 supplying the heat exchanger 2.

In the partial oxidation zone 30, 100433 $NM^3/h$ of methane supplemented with saturated steam ($H_2O$/methane ratio=1, molar %) was supplied via line 31a, and 64650 $NM^3/h$ of oxygen was supplied via line 31b to form, by partial oxidation, a first heating fluid HF at 1150° C., which was cooled to 1000° C. in the reactor-exchanger R before being re-heated in the complementary second partial oxidation zone 32. 20883 NM³/h of methane and 19776 NM³/h of oxygen were supplied to zone 32 with steam ($H_2O$/methane=1, molar %). The methane was supplied at 20° C., and the steam under saturated vapour conditions. Said complementary partial oxidation raised the HF temperature to 1150° C. The HF again transmitted heat to the tubes 38 and its temperature fell to 845° C.

Next, the second complementary partial oxidation zone 34 was supplied with a flow of 28285 NM³/h of methane and 12993 NM³/h of oxygen, with steam ($H_2O$/methane=1, molar %) under the same conditions as for zone 32. Said zone 34 was a catalytic oxidation zone and used a catalyst comprising 5% by weight of rhodium as described in Example 1 of United States patent application US 2002/0004450 A1, or that of Example 1 of U.S. Pat. No. 5,510,056. The overall mixture with HF of said catalytic complementary partial oxidation (this mixture also being an HF fluid) raised the initial temperature of the HF to 900° C. The HF again transmitted heat to the tubes 38, and its temperature fell to 750° C. at the outlet from R, forming a second synthesis gas SG2 which circulated in line 27.

Said second synthesis gas SG2 was mixed with SG1 to form an overall synthesis gas SG which was cooled to 662° C. in heat exchanger 2 then passed, via line 28, to the heat exchanger 2c in which it was cooled to 546° C. Said exchanger 2c pre-heated the feed F2 supplemented with steam to 500° C.

The synthesis gases SG1, SG2 and the final synthesis gas SG obtained (which comprised 469182 NM³ of $H_2$+CO) had the following compositions, in % molar, taking $H_2O$ into account:

| | Molar % | | |
|---|---|---|---|
| | SG1: steam reforming effluent (line 4) | SG2: POX effluent (lines 27, 28) | SG: final synthesis gas (line 29) |
| $H_2$ | 47.9 | 45 | 46 |
| CO | 8.9 | 16.3 | 13.8 |
| $CO_2$ | 5.3 | 7.5 | 6.8 |
| $CH_4$ | 3.7 | 2.3 | 2.8 |
| $H_2O$ | 34.2 | 28.9 | 30.6 |

The skilled person can readily deduce from the above description the design of a facility to carry out the process of the invention, and its function, in the case in which the heating fluid HF results from a typically total combustion of generally gaseous hydrocarbons, and not from partial oxidation with oxygen in the presence of steam: in this case, the HF stream circulating in line 28 consists of fumes under pressure and is not mixed with the synthesis gas SG1 from steam reforming circulating in line 4. The temperatures which can be used for HF, in particular at the outlet from the complementary combustion zone(s), are identical. This implementation of the invention avoids the need for the production of oxygen. The air used may be compressed in the compressor part of a gas turbine, and the heating fluid HF resulting from staged combustion, which is in accordance with the process of the invention, may be depressurized in the turbine portion of the gas turbine, or another turbine, after use as the heating fluid for steam reforming and preferably pre-steam reforming. It may be useful to carry out complementary combustion before depressurizing in the turbine, to maximize the mechanical energy recovered.

The synthesis gas SG may be subjected downstream to CO steam conversion, to produce hydrogen. In this case, a portion of the hydrogen produced, after eliminating $CO_2$ (for example by washing with amines), may optionally be used as a fuel to heat the reactor-exchanger R, as the feed F2 and/or feed F3 added to HF during staged oxidation. It is also possible to use, for F2 and/or F3 (the combustible portion of HF), a purge gas (typically comprising CO and residual methane, and usually $CO_2$), derived from the purification of a stream derived from SG by pressure swing adsorption (PSA). Said adsorption is typically a final purification after shift conversion of the CO contained in SG.

Synthesis gas may also be used for chemical conversion, for example into alcohols or other oxygen-containing compounds or into olefins and/or paraffins, usually after adjusting the $H_2$/CO ratio (for example by separating excess hydrogen).

The entire disclosure[s] of all applications, patents and publications, cited herein and of corresponding French Application No. 05/09.668, filed Sep. 21, 2005 is [are] incorporated by reference herein.

The preceding examples can be repeated with similar success by substituting the generically or specifically described reactants and/or operating conditions of this invention for those used in the preceding examples.

From the foregoing description, one skilled in the art can easily ascertain the essential characteristics of this invention and, without departing from the spirit and scope thereof, can make various changes and modifications of the invention to adapt it to various usages and conditions.

The invention claimed is:

1. A process for producing a synthesis gas SG from a general feed F constituted by hydrocarbons and optionally recycled compounds, F comprising a first feed F1, a second feed F2 and a third feed F3, in which:

a stream comprising the first feed F1 supplemented with steam undergoes steam reforming to produce at least one fraction of synthesis gas SG in a multi-tube reactor-exchanger R comprising a plurality of reaction tubes (38) containing a steam reforming catalyst, and a shell containing said tubes, the first feed F1 supplemented with steam circulating inside a plurality of tubes in one direction;

said reaction tubes (38) are heated principally by convection by circulating a heating fluid HF external to and in direct contact with said tubes in said shell, as a cross-current but overall as a counter-current to said one direction of the circulation of F1, in which HF comprises at least a first stream of gas from partial or total combustion of the second feed F2, then said fluid HF is mixed in one to four staged complementary combustion zones, separated by baffles extending across the tubes, to form a mixture inside the shell with at least a portion of the third feed F3 and a gas containing oxygen to increase the temperature of said first stream, with the provision that at least a portion of F3 and said gas containing oxygen are injected at a point inside the shell of the reactor-exchanger R under turbulent conditions and/or recirculation conditions sufficient to obtain homogeneous flameless combustion in at least one zone of the shell of the reactor-exchanger R, and with the further provisions that F3 is hydrogen separated from a fraction of said synthesis gas SG, then said mixture is circulated in the reactor-exchanger R substantially throughout the shell guided by said baffles in alternating opposite directions across the tubes to provide complementary heat to the reaction tubes (38) before leaving the reactor-exchanger; and synthesis gas SG is produced from the steam reforming effluent F1 and optionally from part or all of the HF.

2. A process according to claim 1, in which at least a portion of F3 and a gas containing oxygen are injected at a point inside the shell of the reactor-exchanger R upstream of and proximate to a catalytic combustion zone, under conditions in which the temperature of the mixture obtained from the catalytic combustion is lower than the temperature in which combustion occurs with a flame.

3. A process according to claim 1, in which the complementary combustion zones are free of reaction tubes and substantially contiguous with the inner wall of the shell of the reactor-exchanger.

4. A process according to claim 1, in which said stream comprising the first feed F1 supplemented with steam is pre-heated to between 500° C. and 740° C. before it enters the reactor-exchanger R, the temperature of the steam reforming effluent at the outlet from the reactor-exchanger R is in the range of 800° C. to 950° C., and the temperature of HF at the outlet from the reactor-exchanger R is in the range of 850° C. to 1150° C.

5. A process according to claim 1, in which said heating fluid HF is a gas from the total combustion of hydrocarbons in air using a pressure in the range of 0.4 to 4 MPa.

6. A process according to claim 1, in which F2 comprises a purge gas derived from a pressure swing adsorption step PSA carried out on a stream derived from SG.

7. A process according to claim 1, wherein said heating fluid HF is circulated in direct contact with said tubes throughout the shell whereby heat transfer to the tubes is conducted substantially solely from gas inside the shell directly to the tubes.

8. A process according to claim 1, wherein HF is produced by partial oxidation and the synthesis gas SG comprises all or part of the HF.

9. A process according to claim 1, wherein at least one of the complementary combustion zones is located outside the shell.

10. A process according to claim 1, comprising two to four separate staged complementary combustion zones.

11. A process according to claim 2, in which said stream comprising the first feed F1 supplemented with steam enters the reactor-exchanger R at one end of R, and said catalytic combustion zone is located in the first half of the reactor-exchanger relative to said one end of R.

12. A process according to claim 11, in which said heating fluid HF, at the outlet from the reactor-exchanger R exchanges heat with said stream comprising the first feed F1 supplemented with steam to pre-steam-reform F1 in a reactor-exchanger (2b) before it enters the reactor-exchanger R.

13. A process according to claim 12, in which said stream comprising the first feed F1 supplemented with steam is pre-heated to between 500° C. and 740° C. before it enters the reactor-exchanger R, the temperature of the steam reforming effluent at the outlet from the reactor-exchanger R is in the range of 800° C. to 950° C., and the temperature of HF at the outlet from the reactor-exchanger R is in the range of 850° C. to 1150° C.

14. A process according to claim 1, in which said heating fluid HF, at the outlet from the reactor-exchanger R exchanges heat with said stream comprising the first feed F1 supplemented with steam to pre-steam-reform F1 in a reactor-exchanger (2b) before it enters the reactor-exchanger R.

15. A process according to claim 14, in which said stream comprising the first feed F1 supplemented with steam is pre-heated to between 500° C. and 740° C. before it enters the reactor-exchanger R, the temperature of the steam reforming effluent at the outlet from the reactor-exchanger R is in the range of 800° C. to 950° C., and the temperature of HF at the outlet from the reactor-exchanger R is in the range of 850° C. to 1150° C.

16. A process according to claim 1, in which said heating fluid HF is a stream from the partial oxidation of hydrocarbons with substantially pure oxygen at a pressure in the range of 0.5 to 12 MPa.

17. A process according to claim 16, wherein synthesis gas SG is produced from all or part of the HF.

18. A process according to claim 1, in which the complementary combustion zones are zones which are free of reaction tubes and substantially contiguous with the inner wall of the shell of the reactor-exchanger.

19. A process according to claim 18, in which said heating fluid HF, at the outlet from the reactor-exchanger R exchanges heat with said stream comprising the first feed F1 supplemented with steam to pre-steam-reform F1 in a reactor-exchanger (2b) before it enters the reactor-exchanger R.

20. A process according to claim 19, in which said stream comprising the first feed F1 supplemented with steam is pre-heated to between 500° C. and 740° C. before it enters the reactor-exchanger R, the temperature of the steam reforming effluent at the outlet from the reactor-exchanger R is in the range of 800° C. to 950° C., and the temperature of HF at the outlet from the reactor-exchanger R is in the range of 850° C. to 1150° C.

21. A process for producing a synthesis gas SG from a general feed F constituted by hydrocarbons and optionally recycled compounds, F comprising a first feed Fl, a second feed F2 and a third feed F3, in which:
a stream comprising the first feed F1 supplemented with steam undergoes steam reforming to produce at least one fraction of synthesis gas SG in a multi-tube reactor-exchanger R comprising a plurality of reaction tubes (38) containing a steam reforming catalyst, and a shell containing said tubes, the first feed F1 supplemented with steam circulating inside a plurality of tubes in one direction;
said reaction tubes (38) are heated principally by convection by circulating a heating fluid HF external to and in direct contact with said tubes in said shell, as a cross-current but overall as a counter-current to said one direction of the circulation of Fl, in which HF comprises at least a first stream of gas from partial or total combustion of the second feed F2, then said fluid HF is mixed in one to four separate staged complementary combustion zones to form a mixture inside the shell with at least a portion of the third feed F3 and said gas comprising oxygen to increase the temperature of said first stream, with the provision that at least a portion of F3 and a gas containing oxygen are injected at a point inside the shell of the reactor-exchanger R under turbulent conditions and/or recirculation conditions sufficient to obtain homogeneous flameless combustion in at least one zone of the shell of the reactor-exchanger R, and with the further provisions that F3 is hydrogen separated from a fraction of said synthesis gas SG, then said mixture is circulated in the reactor-exchanger R to provide complementary heat to the reaction tubes (38) before leaving the reactor-exchanger; and
synthesis gas SG is produced from the steam reforming effluent F1 and optionally from part or all of the HF.

22. A process according to claim 21, comprising at least two to four separate staged complementary combustion zones.

* * * * *

UNITED STATES PATENT AND TRADEMARK OFFICE
CERTIFICATE OF CORRECTION

PATENT NO. : 8,025,862 B2  Page 1 of 1
APPLICATION NO. : 11/523805
DATED : September 27, 2011
INVENTOR(S) : Alexandre Rojey et al.

It is certified that error appears in the above-identified patent and that said Letters Patent is hereby corrected as shown below:

In The Claims:

In claim 22, at column 12, line 61 reads: "22. A process according to claim 21, comprising at least" should read: --22. A processing according to claim 21, comprising--.

Signed and Sealed this
Sixth Day of March, 2012

David J. Kappos
*Director of the United States Patent and Trademark Office*